(12) United States Patent
Kaylo et al.

(10) Patent No.: US 6,290,830 B1
(45) Date of Patent: Sep. 18, 2001

(54) ELECTRODEPOSITABLE COATINGS, AQUEOUS RINSING SYSTEMS FOR TREATING ELECTROCOATED SUBSTRATES AND PROCESSES RELATED THERETO

(75) Inventors: Alan J. Kaylo, Glenshaw, PA (US); Neil D. McMurdie, Elyria, OH (US)

(73) Assignee: PPG Industries Ohio, inc., Cleveland, OH (US)

( * ) Notice: Subject to any disclaimer, the term of this patent is extended or adjusted under 35 U.S.C. 154(b) by 0 days.

(21) Appl. No.: 09/430,229

(22) Filed: Oct. 29, 1999

(51) Int. Cl.[7] ................................................ C25D 13/10

(52) U.S. Cl. ........................ 204/499; 204/489; 205/317

(58) Field of Search ............................ 204/489, 499; 205/317

(56) References Cited

U.S. PATENT DOCUMENTS

| | | | |
|---|---|---|---|
| 3,455,806 | 7/1969 | Spoor | 204/181 |
| 3,658,921 | 4/1972 | Wessendorf et al. | 260/633 |
| 3,711,561 | 1/1973 | Wessendorf | 260/633 |
| 3,749,657 | 7/1973 | Le Bras et al. | 204/181 |
| 3,928,157 | 12/1975 | Suematsu et al. | 204/181 |
| 4,263,424 | 4/1981 | Buckley et al. | 528/85 |
| 4,595,691 | 6/1986 | LaMarre et al. | 514/367 |
| 4,661,503 | 4/1987 | Martin et al. | 514/372 |
| 4,725,587 | 2/1988 | Whitekettle et al. | 514/75 |
| 4,725,623 | 2/1988 | Whitekettle et al. | 514/634 |
| 4,725,624 | 2/1988 | Whitekettle et al. | 514/643 |
| 4,732,905 | 3/1988 | Donofrio et al. | 514/372 |
| 4,732,911 | 3/1988 | Whitekettle et al. | 514/493 |
| 4,732,913 | 3/1988 | Donofrio et al. | 514/528 |
| 4,753,961 | 6/1988 | Donofrio et al. | 514/517 |

(List continued on next page.)

FOREIGN PATENT DOCUMENTS

| | | |
|---|---|---|
| 0608914 | 8/1994 | (EP). |
| 2 331 356 | 6/1977 | (FR). |
| 8231320 | 9/1996 | (JP). |

OTHER PUBLICATIONS

Angus Chemical Company Material Safety Data Sheet, CANGUARD™ 409, 1992.
Rohm and Haas Company Material Safety Data Sheet, KATHON® LX Microbicide, 1993.
Webster's Third New International Dictionary, 1971.
Angus Chemical Company Technical Data Sheet, CANGUARD® BNS, TDS 69, 1999.
Angus Chemical CompanyTechnical Data Sheet, CANGUARD® 409 & 409–4, 1998.
Kathon® EDC 1.5% Microbicide for Electrodeposition Systems (No Date Available).

Primary Examiner—Kishor Mayekar
(74) Attorney, Agent, or Firm—Deborah M. Altman

(57) ABSTRACT

The present invention provides electrodepositable compositions that in the absence of a microorganism control agent electrodeposit upon a surface of an electroconductive substrate as a substantially smooth film and which upon the addition of a microorganism control agent mixture of 5-chloro-2-methyl-4-isothiazolin-3-one and 2-methyl-4-isothiazolin-3-one result in an electrodepositable composition that upon electrodeposition onto the surface of the electroconductive substrate produces a comparatively rougher film, wherein all or a portion of the mixture of 5-chloro-2-methyl-4-isothiazolin-3-one and 2-methyl-4-isothiazolin-3-one is replaced with an aliphatic hydrocarbon material selected from halonitroalkanes, halonitroalkenes, hydroxyalkyl substituted nitroalkanes and mixtures thereof resulting in an electrodepositable compositions that upon electrodeposition onto the surface of the electroconductive substrate produce a substantially smooth film. Aqueous compositions for rinsing electrocoated substrates and processes including such aliphatic hydrocarbon materials are also disclosed.

2 Claims, 1 Drawing Sheet

U.S. PATENT DOCUMENTS

| | | | |
|---|---|---|---|
| 4,855,296 | 8/1989 | Donofrio et al. | 514/241 |
| 4,857,557 | 8/1989 | Donofrio et al. | 514/711 |
| 4,859,702 | 8/1989 | Whitekettle et al. | 514/520 |
| 4,859,705 | 8/1989 | Donofrio et al. | 514/600 |
| 4,859,708 | 8/1989 | Donofrio et al. | 514/727 |
| 4,863,960 | 9/1989 | Donofrio et al. | 514/526 |
| 4,891,111 | 1/1990 | McCollum et al. | 204/181.7 |
| 4,914,134 | 4/1990 | Donofrio et al. | 514/665 |
| 4,922,030 | 5/1990 | Nocito et al. | 568/713 |
| 4,933,056 | 6/1990 | Corrigan et al. | 204/181.7 |
| 4,966,775 | 10/1990 | Donofrio et al. | 424/661 |
| 5,045,104 | 9/1991 | McCoy | 71/67 |
| 5,053,545 | 10/1991 | Marman et al. | 564/495 |
| 5,112,871 | 5/1992 | Austin | 514/727 |
| 5,118,713 | 6/1992 | Donofrio et al. | 514/709 |
| 5,158,596 | 10/1992 | Sherba et al. | 71/67 |
| 5,206,277 | 4/1993 | Winkle | 524/259 |
| 5,234,958 | 8/1993 | Donofrio et al. | 514/642 |
| 5,292,763 | 3/1994 | Hsu | 514/372 |
| 5,385,605 | 1/1995 | Syrinek | 106/18.33 |
| 5,444,088 | 8/1995 | Syrinek | 514/526 |
| 5,468,759 | 11/1995 | Hsu | 514/372 |
| 5,591,760 | 1/1997 | Hsu | 514/372 |
| 5,641,411 * | 6/1997 | Williams et al. | 210/749 |
| 5,759,786 | 6/1998 | Hsu | 435/7.2 |
| 5,760,107 | 6/1998 | Valko et al. | 523/404 |
| 5,820,987 | 10/1998 | Kaufman et al. | 428/413 |

* cited by examiner

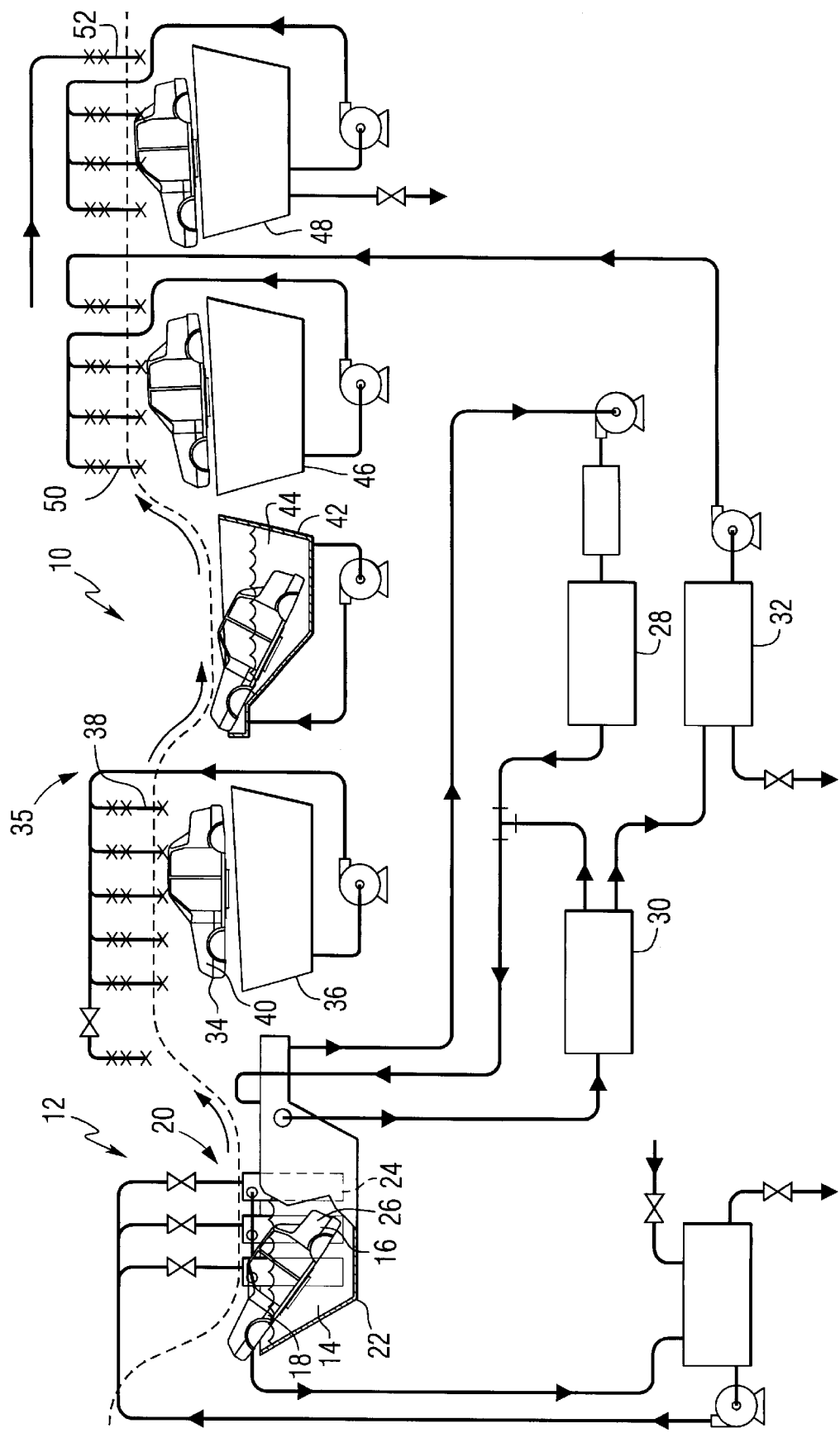

ELECTRODEPOSITABLE COATINGS, AQUEOUS RINSING SYSTEMS FOR TREATING ELECTROCOATED SUBSTRATES AND PROCESSES RELATED THERETO

FIELD OF THE INVENTION

The present invention relates to electrodeposition processes and, more particularly, to electrodepositable coatings and aqueous rinsing systems that provide electrocoated substrates having good smoothness and appearance.

BACKGROUND OF THE INVENTION

Electrodeposition has become the primary method for applying corrosion-resistant primers in automotive applications. Advantages of electrodeposition over non-electrophoretic coating processes include increased paint utilization which reduces raw material and waste disposal costs, as well as improved corrosion protection.

The electrodeposition process involves immersing an electroconductive substrate into a bath of an aqueous electrocoating composition, the substrate serving as a charged electrode in an electrical circuit comprising the electrode and an oppositely charged counter-electrode. Sufficient electrical current is applied between the electrodes to deposit a substantially continuous, adherent film of the electrocoating composition onto the surface of the electroconductive substrate.

The electrocoated substrate is then conveyed to a rinsing operation where it is rinsed with an aqueous rinsing composition. Typical rinsing operations have multiple stages which can include closed loop spray and/or dip applications such as are described below. For example, in a spray rinse application the electrocoated substrate exits the electrocoating tank and is conveyed over a rinse tank while an aqueous rinsing composition is spray applied to the electrocoated surfaces of the substrate. Excess rinsing composition is permitted to drain from the substrate into the rinse tank below. The rinsing composition is then recirculated to the spraying apparatus for subsequent spray applications. In a dip rinse application, the electrocoated substrate is conveyed into a dip tank, where it is immersed in an aqueous rinsing composition, and is subsequently conveyed through one or more spray rinse applications as described above.

Recirculating the coating or rinsing compositions is both economically and environmentally desirable. However, the combination of organic nutrients, warmth and recirculation in an aqueous coating system creates an environment conducive to bacterial and fungal growth. These microorganisms, if left unchecked, can adversely affect the quality and appearance of the electrodeposited coating. Microorganisms present in the coating or rinsing compositions can cause pH shifts, particulate "dirt" deposition and biofouling, which detrimentally affect the appearance of the coating and reduce system performance.

Ethylene glycol ether alcohols can suppress microorganism growth in electrocoating compositions, but are undesirable ecologically. Propylene glycol ether alcohols, often used in HAPS-free (Hazardous Air Pollutant-free) electrocoating compositions, are more ecologically desirable but do not adequately suppress microorganism growth.

A microbiocide composition containing a mixture of 5-chloro-2-methyl-4-isothiazolin-3-one and 2-methyl-4-isothiazolin-3-one[1] has been used commercially in electrodeposition coatings and rinse compositions as the sole microorganism control composition. Although effective for inhibiting and/or controlling the growth of microorganisms in such systems, this microbiocide is relatively expensive and can cause a rougher appearance than a coating composition without this microbiocide. Moreover, such microbiocide compositions can contain, as inert ingredients, metal salts such as magnesium nitrate and magnesium chloride. The presence of metal ions of these salts in electrodeposition systems is undesirable because the metals cause coating defects such as gas generation at the cathode.

[1]KATHON® LX microbiocide which is a mixture of 10–12% of 5-chloro-2-methyl-4-isothiazolin-3-one, 3–5% of 2-methyl-4-isothiazolin-3-one, 14–18% magnesium nitrate, 8–10% magnesium chloride and the remainder water. "KATHON® LX microbiocide", Material Safety Data Sheet of Rohm and Haas Co. (Jun. 24, 1993), which is incorporated herein by reference.

U.S. Pat. No. 4,732,905 discloses biocidal compositions for inhibiting and/or controlling the growth of bacteria in aqueous systems, for example, cooling water and pulp and paper mill systems. The disclosed biocidal compositions comprise a synergistic mixture of 2-bromo-2-nitropropane-1,3-diol and a mixture of 5-chloro-2-methyl-4-isothiazolin-3-one and 2-methyl-4-isothiazolin-3-one. The patent does not disclose, however, the use of these biocidal compositions in electrodeposition systems.

EP 608914 discloses the use of a synergistic microbiocidal composition comprising 4,5-dichloro-2-octyl-3-isothiazolone and 2-bromo-2-nitropropanediol in aqueous paints and coatings, including electrodeposition systems. Although effective in controlling microbial growth, this composition is relatively expensive and can contain undesirable metal ions such as are discussed above.

Therefore, there is a need for electrodeposition and rinsing compositions which provide smooth coatings of good appearance, minimize growth of microorganisms and which do not contain metal ions which need to be removed prior to waste disposal.

SUMMARY OF THE INVENTION

The present invention provides an electrodepositable composition that in the absence of a microorganism control agent electrodeposits upon a surface of an electroconductive substrate as a substantially smooth film and which upon the addition of a microorganism control agent mixture of 5-chloro-2-methyl-4-isothiazolin-3-one and 2-methyl-4-isothiazolin-3-one results in an electrodepositable composition that upon electrodeposition onto the surface of the electroconductive substrate produces a comparatively rougher film, wherein all or a portion of the microorganism control agent mixture of 5-chloro-2-methyl-4-isothiazolin-3-one and 2-methyl-4-isothiazolin-3-one is replaced with an aliphatic hydrocarbon material selected from the group consisting of halonitroalkanes, halonitroalkenes and mixtures thereof resulting in an electrodepositable composition that upon electrodeposition onto the surface of the electroconductive substrate produces a substantially smooth film.

Another aspect of the present invention is an electrodepositable composition that in the absence of a microorganism control agent electrodeposits upon a surface of an electroconductive substrate as a substantially smooth film and which upon the addition of a microorganism control agent mixture of 5-chloro-2-methyl-4-isothiazolin-3-one and 2-methyl-4-isothiazolin-3-one results in an electrodepositable composition that upon electrodeposition onto the surface of the electroconductive substrate produces a comparatively rougher film, wherein all or a portion of the microorganism control agent mixture of 5-chloro-2-methyl-4-isothiazolin-3-one and 2-methyl-4-isothiazolin-3-one is replaced with a hydroxyalkyl substituted nitroalkane resulting in an electrodepositable composition that upon electrodeposition onto the surface of the electroconductive substrate produces a substantially smooth film.

Yet another aspect of the present invention is a process for electrodepositing a substantially smooth film upon a surface of an electroconductive substrate, the process comprising immersing the electroconductive substrate serving as a charged electrode in an electrical circuit comprising the electrode and an oppositely-charged counter electrode into an electrodepositable composition that upon passing electric current between the electrodes causes a substantially continuous film to deposit upon the electroconductive substrate, wherein the electrodepositable composition in the absence of a microorganism control agent electrodeposits on the electroconductive substrate as a substantially smooth film and which upon the addition of a microorganism control agent mixture of 5-chloro-2-methyl-4-isothiazolin-3-one and 2-methyl-4-isothiazolin-3-one results in an electrodepositable composition that upon electrodeposition onto the surface of the electroconductive substrate produces a comparatively rougher film, wherein all or a portion of the microorganism control agent mixture of 5-chloro-2-methyl-4-isothiazolin-3-one and 2-methyl-4-isothiazolin-3-one is replaced by an aliphatic hydrocarbon material selected from the group consisting of halonitroalkanes, halonitroalkenes and mixtures thereof resulting in an electrodepositable composition that upon electrodeposition onto the surface of the electroconductive substrate produces a substantially smooth film.

Yet another aspect of the present invention is a process for electrodepositing a substantially smooth film upon a surface of an electroconductive substrate, the process comprising immersing the electroconductive substrate serving as a charged electrode in an electrical circuit comprising the electrode and an oppositely-charged counter electrode into an electrodepositable composition that upon passing electric current between the electrodes causes a substantially continuous film to deposit upon the electroconductive substrate, wherein the electrodepositable composition in the absence of a microorganism control agent electrodeposits on the electroconductive substrate as a substantially smooth film and which upon the addition of a microorganism control agent mixture of 5-chloro-2-methyl-4-isothiazolin-3-one and 2-methyl-4-isothiazolin-3-one results in an electrodepositable composition that upon electrodeposition onto the surface of the electroconductive substrate produces a comparatively rougher film, wherein all or a portion of the microorganism control agent mixture of 5-chloro-2-methyl-4-isothiazolin-3-one and 2-methyl-4-isothiazolin-3-one is replaced by a hydroxyalkyl substituted nitroalkane resulting in an electrodepositable composition that upon electrodeposition onto the surface of the electroconductive substrate produces a substantially smooth film.

Another aspect of the present invention is an aqueous electrocoat rinse composition for rinsing a surface of an electrocoated substrate comprising an aliphatic hydrocarbon material selected from the group consisting of halonitroalkanes, halonitroalkenes and mixtures thereof.

Yet another aspect of the present invention is an aqueous electrocoat rinse composition for rinsing a surface of an electrocoated substrate comprising a hydroxyalkyl substituted nitroalkane.

In an aqueous rinse system for rinsing a surface of an electrocoated substrate, the aqueous rinse system comprising bacterial contaminants, in another aspect of the present invention the improvement comprises adding an aliphatic hydrocarbon material selected from the group consisting of halonitroalkanes, halonitroalkenes and mixtures thereof to the aqueous rinse system.

In an aqueous rinse system for rinsing a surface of an electrocoated substrate, the aqueous rinse system comprising bacterial contaminants, in another aspect of the present invention the improvement comprises adding a hydroxyalkyl substituted nitroalkane to the aqueous rinse system.

Yet another aspect of the present invention is a process for coating a surface of an electrically conductive substrate, the process comprising the steps of: (a) electrocoating an electrically conductive substrate serving as a charged electrode in an electrical circuit comprising the electrode and an oppositely-charged counter electrode immersed in an aqueous electrocoating composition by passing electric current between said electrodes to form an electrodeposited coating of the aqueous electrocoating composition upon a surface of the substrate; and (b) rinsing the electrodeposited coating with an aqueous rinsing composition, wherein at least one of the aqueous electrocoating composition or the aqueous rinsing composition comprises an aliphatic hydrocarbon material selected from the group consisting of halonitroalkanes, halonitroalkenes and mixtures thereof.

Another aspect of the present invention is a process for coating a surface of an electrically conductive substrate, the process comprising the steps of: (a) electrocoating an electrically conductive substrate serving as a charged electrode in an electrical circuit comprising the electrode and an oppositely-charged counter electrode immersed in an aqueous electrocoating composition by passing electric current between said electrodes to form an electrodeposited coating of the aqueous electrocoating composition upon a surface of the substrate; and (b) rinsing the electrodeposited coating with an aqueous rinsing composition, wherein at least one of the aqueous electrocoating composition or the aqueous rinsing composition comprises a hydroxyalkyl substituted nitroalkane.

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers, homopolymers and copolymers.

BRIEF DESCRIPTION OF THE DRAWING

The foregoing summary, as well as the following detailed description of the preferred embodiments, will be better understood when read in conjunction with the appended drawing. In the drawing:

FIG. 1 is a schematic diagram of a process for applying an electrodepositable coating composition to an electroconductive substrate and rinsing the coated substrate according to the present invention.

DETAILED DESCRIPTION OF THE PREFERRED EMBODIMENTS

The aqueous electrodepositable coating compositions and rinsing compositions of the present invention will now be discussed with reference to typical continuous automotive electrocoating and rinsing processes, although one skilled in the art would understand that the electrocoating and rinsing compositions of the present invention can be used to coat any electroconductive substrate, such as an industrial vehicle or part, in a batch or continuous process.

Referring now to FIG. 1, in which like numerals indicate like elements throughout, there is shown a schematic diagram of a continuous process (indicated generally as 10) for applying an electrodepositable coating composition to an electrically conductive substrate and rinsing the coated substrate according to the present invention. In a continuous process, the substrate is in continuous movement along an assembly line.

Useful electrically conductive substrates that can be coated according to the process of the present invention include those formed from metallic materials, for example ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium.

Preferably, the electrically conductive substrates are used as components to fabricate automotive vehicles, including but not limited to automobiles, trucks and tractors. The electrically conductive substrates can have any shape, but are preferably in the form of automotive body components such as bodies (frames), hoods, doors, fenders, bumpers and/or trim for automotive vehicles. The present invention first will be discussed generally in the context of coating a metallic automobile body. One skilled in the art would understand that the process of the present invention also is useful for coating non-automotive electrically conductive components.

Prior to treatment according to the process of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate.

Referring now to FIG. 1, in the electrodeposition portion 12 of the process 10 of the present invention, a liquid electrodepositable coating composition 14 is applied to a surface 16 of the electrically conductive automobile body 18 in a first step 20, for example by dipping the automobile body 18 into a bath 22 containing the liquid electrodepositable coating composition 14. The liquid electrodepositable coating composition 14 can be applied to the surface 16 of the automobile body 18 by any suitable anionic or cationic electrodeposition process well known to those skilled in the art.

In a cationic electrodeposition process, the liquid electrodepositable coating composition 14 is placed in contact with an electrically conductive anode 24 and an electrically conductive cathode (the electrically conductive surface 16 of the automobile body 18). Following contact with the liquid electrodepositable coating composition 14, an adherent film 26 of the coating composition is deposited on the automobile body 18 when sufficient voltage is impressed between the electrodes. The conditions under which electrodeposition is carried out are, in general, similar to those used in electrodeposition of other coatings. The applied voltages can be varied and can be, for example, as low as 1 volt to as high as several thousand volts, but typically between 50 and 500 volts. The current density is usually between 0.5 and 15 amperes per square foot and tends to decrease during electrodeposition indicating the formation of an insulating film.

Electrodepositable coating compositions which are useful in the present invention typically are supplied as two components: (1) a clear resin feed, which generally includes one or more film-forming materials (ionic electrodepositable resins), crosslinking material(s), and any additional water-dispersible, non-pigmented components; and (2) a pigment paste, which generally includes one or more pigments, a water-dispersible grind resin which can be the same film-forming material as in the clear resin feed or a chemically different film-forming material selected from those discussed below, and, optionally, additives such as wetting or dispersing aids. Electrodeposition bath components (1) and (2) are dispersed in an aqueous medium which can include an admixture of water with coalescing solvents.

In the past, a microorganism control agent mixture of 5-chloro-2-methyl-4-isothiazolin-3-one and 2-methyl-4-isothiazolin-3-one was included in the electrodepositable coating composition to inhibit and/or control the growth of microorganisms, such as bacteria, fungi and algae, in the electrodeposition system. However, as discussed above and as shown in Table 1 of Example 1 below, use of such a microbiocide can detract from the appearance and cause surface roughness of the electrodeposited coating compared to the same coating composition without such a microorganism control agent mixture.

To reduce or eliminate this appearance problem, in the present invention all or a portion of the microorganism control agent mixture of 5-chloro-2-methyl-4-isothiazolin-3-one -one and 2-methyl-4-isothiazolin-3-one is replaced with one or more aliphatic hydrocarbon materials selected from the group consisting of halonitroalkanes, halonitroalkenes, hydroxyalkyl substituted nitroalkanes and mixtures thereof.

Non-limiting examples of suitable halonitroalkanes can have the following formula (I):

wherein one or more of the substituent groups $R_1$, $R_2$, and $R_3$ is independently selected from halogen groups such as chlorine, bromine (preferred) or mixtures thereof.

Any remaining substituent groups which are not halogen groups are independently selected from hydrogen, lower alkyl groups, hydroxyalkyl groups, aryl groups and amide groups. Non-limiting examples of suitable alkyl groups can be linear (preferred) or branched and comprise 1 to 4 carbon atoms. Examples of useful alkyl groups include methyl, ethyl, propyl and butyl. Non-limiting examples of suitable hydroxyalkyl groups include hydroxymethyl (—$CH_2OH$) and $R_9CHOH$ where $R_9$ is selected from the group consisting of hydrogen, alkyl groups such as are listed above, and aryl groups. Useful aryl groups include phenyl and naphthyl.

A preferred halonitroalkane is 2-bromo-2-nitro-1,3-propanediol (2-bromo-2-nitropropane-1,3-diol) in which $R_2$ is bromine and $R_1$ and $R_3$ are hydroxymethyl groups. Examples of commercially available preferred 2-bromo-2-nitro-1,3-propanediol materials are CANGUARD® 409 2-bromo-2-nitro-1,3-propanediol powder and CANGUARD® 409-40 (a 40% by weight solution of CANGUARD® 409 in a mixture of dipropylene glycol monomethyl ether and water) which are commercially available from Angus Chemical Co. of Buffalo Grove, Ill. "CANGUARD® 409 & 409-40", a Technical Data Sheet of Angus Chemical Co. TDS-39 1997, which is incorporated herein by reference.

One skilled in the art would understand that mixtures of chemically different halonitroalkanes discussed above (for example having different substituent groups or isomers thereof) can be used.

Non-limiting examples of suitable halonitroalkenes can have the following formula (II):

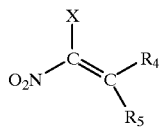

(II)

wherein X is a halogen group such as bromine or chlorine and $R_4$ and $R_5$ are independently selected from the group consisting of hydrogen, halogen groups, lower alkyl groups, hydroxyalkyl groups, aryl groups and amide groups such as are discussed above.

A preferred halonitroalkene is β-bromo-β-nitrostyrene in which X is bromine, $R_4$ is hydrogen and $R_5$ is an phenyl group, such as CANGUARD® BNS liquid which is commercially available from Angus Chemical Co. "CANGUARD® BNS", a Technical Bulletin of Angus Chemical Co. (1999).

One skilled in the art would understand that mixtures of chemically different halonitroalkenes discussed above (for example having different substituent groups or isomers thereof) can be used.

Non-limiting examples of suitable hydroxyalkyl substituted nitroalkanes can have the following formula (III):

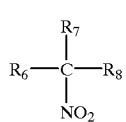

(III)

wherein at least one of the substituent groups $R_6$, $R_7$, and $R_8$ is independently selected from hydroxyalkyl groups such as are discussed above. Any remaining substituent groups (i.e., $R_1$, $R_2$ or $R_3$ groups which are not hydroxyalkyl groups as set forth above) are independently selected from hydrogen, lower alkyl groups, aryl groups, amide groups and halogen groups such as are set forth above. A preferred hydroxyalkyl substituted nitroalkane is 2-bromo-2-nitro-1,3-propanediol in which $R_7$ is bromine and $R_6$ and $R_8$ are hydroxymethyl groups.

One skilled in the art would understand that mixtures of chemically different hydroxyalkyl substituted nitroalkanes discussed above (for example having different substituent groups or isomers thereof) can be used.

Also, one skilled in the art would understand that a mixture of one or more halonitroalkane(s), halonitroalkene(s) and/or hydroxyalkyl substituted nitroalkane(s) can be used as the aliphatic hydrocarbon material in the present invention.

The aliphatic hydrocarbon material can be present in the electrodeposition coating composition in an amount of at least 1 parts per million (ppm) to at least 5 ppm, preferably at least 5 ppm to at least 10 ppm, and more preferably at least 10 ppm to at least 50 ppm based on total electrodeposition coating composition weight. The aliphatic hydrocarbon material also can be present in the electrodeposition bath in an amount less than 1000 ppm to less than 500 ppm, preferably less than 500 ppm to less than 200 ppm, and more preferably less than 200 ppm to less than 100 ppm based on total electrodeposition coating composition weight. The amount of the aliphatic hydrocarbon material present in the electrodeposition coating composition can range between any combination of these values inclusive of the recited values.

If used in combination with another microorganism control agent such as the mixture of 5-chloro-2-methyl-4-isothiazolin-3-one and 2-methyl-4-isothiazolin-3-one, the amount of the other microorganism control agent(s) present in the electrodeposition coating composition can range from 50 ppm to 500 ppm, and preferably 10 ppm to 200 ppm. Preferably, the electrodeposition coating composition is essentially free of (i.e., contains less than 10 ppm) and more preferably is free of 5-chloro-2-methyl-4-isothiazolin-3-one and/or 2-methyl-4-isothiazolin-3-one. While peroxides and hypochlorides can be included, it is preferred that the aliphatic hydrocarbon material be the sole microorganism control agent in the electrodeposition coating composition.

It should be appreciated that there are various methods by which the aliphatic hydrocarbon material can be incorporated into the electrodeposition coating composition. The aliphatic hydrocarbon material can be added "neat," that is, added directly to the coating without prior blending or reacting with other coating components. If added "neat", the microorganism control composition is preferably diluted with water and/or solvent prior to addition to the coating. Alternatively, the aliphatic hydrocarbon material can be added to the pre-dispersed clear resin feed which may include the ionic resin, the curing agent and/or any other non-pigmented component. Also, the aliphatic hydrocarbon material can be dispersed in the pigment paste prior to incorporation of the paste into the electrodeposition coating. Preferably, the aliphatic hydrocarbon material is added as a powder to the pre-dispersed clear resin feed which is subsequently added to the electrodeposition coating composition. If the aliphatic hydrocarbon material is a solid, it is preferably pre-dispersed in water (for example at 40 weight percent in an aqueous solution).

As discussed above, the electrodepositable coating composition generally comprises one or more film-forming materials and crosslinking materials. Suitable film-forming materials include epoxy-functional film-forming materials, polyurethane film-forming materials, and acrylic film-forming materials. The amount of film-forming material in the electrodepositable composition generally ranges from about 50 to about 95 weight percent on a basis of total weight solids of the electrodepositable composition.

Suitable epoxy-functional materials contain at least one epoxy or oxirane group in the molecule, such as di- or polyglycidyl ethers of polyhydric alcohols. Preferably, the epoxy-functional material contains at least two epoxy groups per molecule. Useful polyglycidyl ethers of polyhydric alcohols can be formed by reacting epihalohydrins, such as epichlorohydrin, with polyhydric alcohols, such as dihydric alcohols, in the presence of an alkali condensation and dehydrohalogenation catalyst such as sodium hydroxide or potassium hydroxide. Suitable polyhydric alcohols can be aromatic, aliphatic or cycloaliphatic. Non-limiting examples of suitable aromatic polyhydric alcohols include dihydroxybenzenes, such as resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane, i.e., bisphenol A (preferred). Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

Suitable epoxy-functional materials have an epoxy equivalent weight ranging from about 100 to about 2000, as measured by titration with perchloric acid using methyl violet as an indicator. Useful polyepoxides are disclosed in U.S. Pat. No. 5,820,987 at column 4, line 52 through column 6, line 59, which is incorporated herein by reference. Examples of suitable commercially available epoxy-functional materials are EPON® 828 and 880 epoxy resins, which are epoxy functional polyglycidyl ethers of bisphenol A prepared from bisphenol A and epichlorohydrin and are commercially available from Shell Chemical Company.

The epoxy-functional material can be reacted with amines to form cationic salt groups, such as primary or secondary amines which can be acidified after reaction with the epoxy groups to form amine salt groups or tertiary amines which can be acidified prior to reaction with the epoxy groups and which after reaction with the epoxy groups form quaternary ammonium salt groups. Other useful cationic salt group formers include sulfides.

Suitable acrylic-functional materials include polymers derived from alkyl esters of acrylic acid and methacrylic acid such as are disclosed in U.S. Pat. Nos. 3,455,806 and 3,928,157, which are incorporated herein by reference.

Examples of film-forming resins suitable for anionic electrodeposition include base-solubilized, carboxylic acid-containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are at least partially neutralized interpolymers of hydroxy-alkyl esters of unsaturated carboxylic acids, unsaturated carboxylic acid and at least one other ethylenically unsaturated monomer. Other suitable electrodepositable resins comprise an alkyd-aminoplast vehicle, i.e., a vehicle containing an alkyd resin and an amine-aldehyde resin or mixed esters of a resinous polyol. These compositions are described in detail in U.S. Pat. No. 3,749,657 at column 9, lines 1–75 and column 10, lines 1–13, all of which are herein incorporated by reference. Other acid functional polymers can also be used such as phosphatized polyepoxide or phosphatized acrylic polymers which are well known to those skilled in the art.

Useful crosslinking materials comprise blocked or unblocked polyisocyanates including as aromatic diisocyanates such as p-phenylene diisocyanate, 4,4'-diphenylmethane diisocyanate and 2,4- or 2,6-toluene diisocyanate; aliphatic diisocyanates such as 1,4-tetramethylene diisocyanate and 1,6-hexamethylene diisocyanate; and cycloaliphatic diisocyanates such as isophorone diisocyanate and 4,4'-methylene-bis(cyclohexyl isocyanate). Examples of suitable blocking agents for the polyisocyanates include lower aliphatic alcohols such as methanol, oximes such as methyl ethyl ketoxime and lactams such as caprolactam. The amount of the crosslinking material in the electrodepositable coating composition generally ranges from about 5 to about 50 weight percent on a basis of total resin solids weight of the electrodepositable coating composition.

Generally, the electrodepositable coating composition also comprises one or more pigments which can be incorporated in the form of a paste; water-dispersible, non-pigmented components such as surfactants and wetting agents; catalysts; film build additives; flatting agents; defoamers; microgels; pH control additives; and volatile materials such as water, organic solvents and low molecular weight acids, such as are described in U.S. Pat. No. 5,820,987 at column 9, line 13 through column 10, line 27 (incorporated by reference herein).

Suitable pigments include iron oxides, strontium chromate, carbon black, coal dust, titanium dioxide, talc, barium sulfate, cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

Useful solvents included in the composition, in addition to any provided with other coating components, include coalescing solvents such as hydrocarbons, alcohols, esters, ethers and ketones. Preferred coalescing solvents include alcohols, polyols, ethers and ketones. Non-limiting examples of suitable solvents include isopropanol, butanol, 2-ethylhexanol, isophorone, 4-methoxy-2-pentanone, ethylene glycol, propylene glycol and the monoethyl, monobutyl and monohexyl ethers of ethylene glycol. Generally the amount of coalescing solvent ranges from 0.01 and 25 weight percent, and preferably from 0.05 to 5 percent by weight based on total weight of the electrodepositable coating composition.

Generally, the electrodepositable composition has a volatile organic content of less than about 1.0 lb/gal (about 0.12 kg/liter), preferably less than 0.5 lb/gal (about 0.06 kg/liter), and more preferably zero. Preferably, the electrodepositable coating composition is essentially free of hazardous air pollutants (HAPS), such as ethylene glycol ether alcohols, i.e., it contains less than 1 weight percent of HAPS, more preferably less than 0.5 weight percent of HAPS based on total weight of the electrodepositable coating bath composition, and most preferably is free of HAPS.

The electrodepositable compositions of the present invention typically are in the form of an aqueous dispersion. As used herein, "dispersion" means a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually ranges from 2 to 60 percent by weight based on total weight of the aqueous dispersion (electrodeposition bath). When the electrodepositable compositions are in the form of resin concentrates, they generally have a resin solids content of 20 to 60 percent by weight based on weight of the aqueous dispersion.

Preferably the electrodepositable coating composition is essentially free of metallic materials. "Essentially free of metallic materials" means that the electrodepositable coating composition contains no additional water soluble inert ingredients in the form of metallic materials, for example metal salts such as magnesium chloride, magnesium nitrate or cupric nitrate.

The preferred electrodepositable coating composition comprises, in addition to 2-bromo-2-nitro-1,3-propanediol, epoxy functional polyglycidyl ether of bisphenol A reacted with amines, polyisocyanate crosslinking material and pigments, solvents, plasticizers, surfactants and catalysts such as are mentioned above. Other useful electrodepositable coating compositions are disclosed in U.S. Pat. Nos. 4,891,111; 5,760,107 and 4,933,056, which are incorporated herein by reference.

The thickness of the electrodepositable coating applied to the substrate can vary based upon such factors as the type of substrate and intended use of the substrate, i.e., the environment in which the substrate is to be placed and the nature of the contacting materials. Generally, the thickness of the electrodepositable coating applied to the substrate ranges from about 5 to about 40 micrometers, and more preferably about 12 to about 35 micrometers.

The temperature of the electrodepositable coating composition preferably is controlled by use of a heat exchanger 28. The electrodepositable coating composition is filtered by an ultrafiltration system 30 to remove particulate impurities (ultrafiltrate 32) and recycled to the electrodeposition bath 22. The continual recycling and moisture in the electrodeposition system can cause microorganisms to flourish. The aliphatic hydrocarbon material-containing electrodepositable compositions of the present invention not only suppress microorganism growth, but unexpectedly provide electrocoated substrates having better appearance and smoothness compared to a similar electrodepositable coating composition including a mixture of 5-chloro-2-methyl-4-isothiazolin-3-one and 2-methyl-4-isothiazolin-3-one.

The process of the present invention can further comprise an additional step of applying a second electrodepositable coating upon the surface of the dried electrocoat after the first electrocoat is rinsed. The second electrodepositable coating can be applied in a manner similar to that discussed above for depositing the first electrodepositable coating.

The second electrodepositable coating can be the same or different from the first electrodepositable coating. For example, the individual components of the second electrodepositable coating, such as film-forming material, can vary or the amounts of each component can vary, as desired. Suitable components for the second electrodepositable coating include those discussed above as suitable for the first electrodepositable coating. Preferably, the first electrodepositable coating comprises an epoxy-functional film-forming material and polyisocyanate crosslinking material to provide corrosion resistance and the second electrodepositable coating comprises an acrylic film-forming material and polyisocyanate crosslinking material to provide chip resistance from impacts by stones and road debris as well as resistance to ultraviolet light that can cause photodegradation and loss of adhesion of the coating to the substrate.

After conveying from the electrocoating bath 22, the electrocoated automobile body 34 is exposed to air to permit excess electrodeposited coating composition to drain from the interior cavities and surfaces of the automobile body 18. The electrocoated automobile body 34 is then conveyed to a rinsing process 35 for removing excess electrodepositable coating from the automobile body 34. The rinsing process can include one or more spray and/or dip rinsing operations, as desired. Preferably, the electrocoated automobile body 34 is conveyed over a spray rinsing tank 36 where a first rinsing composition 38 is spray applied to the coated surfaces 40 of the electrocoated automobile body 34. The excess spray composition is permitted to drain into the rinse tank 36 below for recirculation and subsequent spray reapplication.

In an alternative preferred embodiment, the first rinsing composition 38 comprises water and one or more aliphatic hydrocarbon materials such as are discussed above. The aliphatic hydrocarbon material is present in the rinsing composition 38 in an amount of at least 1 ppm to at least 5 ppm, preferably at least 5 ppm to at least 10 ppm, and more preferably at least 10 ppm to at least 20 ppm based on total weight of the rinsing composition. The aliphatic hydrocarbon material also is present in the rinsing composition in an amount of less than 1000 ppm to less than 500 ppm, preferably less than 500 ppm to less than 200 ppm, and more preferably less than 200 ppm to less than 100 ppm based on total weight of the rinsing composition. The amount of the aliphatic hydrocarbon material present in the rinsing composition can range between any combination of these values inclusive of the recited ranges.

If used in combination with another microorganism control agent such as the mixture of 5-chloro-2-methyl-4-isothiazolin-3-one and 2-methyl-4-isothiazolin-3-one, the amount of the other microorganism control agent(s) present in the rinsing composition can range from 50 to 500 ppm, and preferably 10 to 200 ppm. Preferably, the rinsing composition is essentially free of (i.e., contains less than 10 ppm) and more preferably is free of 5-chloro-2-methyl-4-isothiazolin-3-one and/or 2-methyl-4-isothiazolin-3-one. While peroxides and hypochlorides can be included, it is preferred that the aliphatic hydrocarbon material be the sole microorganism control agent in the rinsing composition.

The rinsing composition, since it is typically recycled, also can comprise minor amounts of an electrodepositable coating composition such as is described above which may or may not contain an aliphatic hydrocarbon material as described above.

The spray rinse step typically is followed by a dip rinse step in which the electrocoated automobile body 34 is conveyed to a rinse dip tank 42 and immersed in the aqueous rinsing composition 44 contained therein. The electrocoated automobile body 34 is then conveyed out of the rinse dip tank 42 and the excess rinsing composition is permitted to drain back into the tank for reuse. The aqueous rinsing composition 44 used in the dip rinse can have the same or different components from the first rinsing composition 38 discussed above, but preferably has the same components as the first rinsing composition 38.

The dip rinse step typically is followed by one or more spray applied rinsing steps as the electrocoated automobile body 34 is conveyed over subsequent spray rinsing tanks 46, 48, and aqueous rinsing compositions 50, 52 are spray applied as described above. Preferably, the drainage period for each rinsing step is at least 1 minute so that there is no standing water from the final rinsing composition. The temperature of the air during the drainage period preferably ranges from about 10° C. to about 40° C.

In a preferred alternative embodiment of the invention, both the aqueous electrodepositable coating 14 present in the electrodeposition bath 22 and the aqueous rinsing compositions 38, 44, 50 and 52 present in the rinses comprise one or more of the aliphatic hydrocarbon materials discussed above, alone or in combination with other microorganism control agents.

The electrodepositable and rinse compositions and processes of the present invention provide economic advantages for the control of microorganism growth in electrodeposition and rinsing systems, as well as cost savings in waste disposal because they provide electrodeposition rinsing compositions which are substantially free of metallic materials. The processes of the present invention can also provide electrocoated films having improved appearance and smoothness.

The present invention will be described further by reference to the following examples. The following examples are merely illustrative of the invention and are not intended to be limiting. Unless otherwise indicated, all parts and percentages in the following examples, as well as throughout the specification, are by weight.

EXAMPLE 1
Effect of Biocide Concentration on Appearance and Workability

To characterize the effects of 2-bromo-2-nitro-1,3-propane diol versus a mixture of 5-chloro-2-methyl-4-isothiazolin-3-one and 2-methyl-4-isothiazolin-3-one on the appearance and workability of both a leaded and an unleaded electrodepositable coating composition, a series of electrodepositable coating composition were prepared with varying concentrations of 2-bromo-2-nitro-1,3-propane diol[2] biocide versus an aqueous solution containing a mixture of 5-chloro-2-methyl-4-isothiazolin-3-one and 2-methyl-4-isothiazolin-3-one[3] biocides.

[2]CANGUARDS® 409 2-bromo-2-nitro-1,3-propane diol powder which is commercially available from Angus Chemical Co.
[3]KATHON® LX microbiocide which is a mixture of 10–12% of 5-chloro-2-methyl-4-isothiazolin-3-one, 3–5% of 2-methyl-4-isothiazolin-3-one, 14–18% magnesium nitrate, 8–10% magnesium chloride and the remainder water. "KATHON® LX microbiocide", Material Safety Data Sheet of Rohm and Haas Co. (Jun. 24, 1993).

The leaded and unleaded electrodepositable coating compositions used in this Example 1 were ED5050B and ED6750, respectively, both of which are commercially available from PPG Industries, Inc. of Pittsburgh, Pa. In each experiment, the electrodepositable coating bath was prepared and allowed to stir at room temperature overnight. Phosphated, cold-rolled steel panels were then electrocoated with each electrodepositable coating composition (see Table 1 below for conditions) and baked in an electric oven for 30 minutes at 177° C. (350° F.). The film thickness on each panel was measured using a Fisher MD11 Permascope and each panel was visually rated for appearance on a scale of 1 to 10, with 1 denoting the poorest appearance and 10 denoting the best appearance. A rating of 8 or above is defined herein as a "substantially smooth" coating. For baths which demonstrated lower than expected (0.9±0.05 mil) (0.023 millimeters (mm)±0.0013 mm) film thickness, additional panels were coated at higher voltages in order to achieve 0.9 mil (0.023 mm) thickness. The resultant higher voltage panels were then also rated for appearance. The data from these experiments are summarized in Table 1 below:

TABLE 1

| Bath Code | Biocide | ppm Biocide | Film build 2 min. coatout 90 F/200 V | Appearance Rating | Voltage needed for 0.9 mil | Higher voltage Film Build | Appearance Rating |
|---|---|---|---|---|---|---|---|
| | | | Leaded | | | | |
| ED5050B | None | 0 | 0.86 mil | 9 | N/A | N/A | N/A |
| ED5050B | CANGUARD® 409[4] | 300 | 0.86 mil | 9 | N/A | N/A | N/A |
| ED5050B | KATHON® LX[5] | 300 | 0.82 mil | 8 | N/A | N/A | N/A |
| ED5050B | CANGUARD® 409 | 600 | 0.85 mil | 9 | N/A | N/A | N/A |
| ED5050B | KATHON® LX | 600 | 0.69 mil | 8 | 240 V | 0.91 | 7 |
| ED5050B | CANGUARD® 409 | 1000 | 0.81 mil | 9 | 220 V | 0.89 | 9 |
| ED5050B | KATHON® LX | 1000 | 0.5 mil | 5 | 270 V | 0.86 | 2 |
| | | | Unleaded | | | | |
| ED6750 | None | 0 | 0.89 mil | 9 | N/A | N/A | N/A |
| ED6750 | CANGUARD® 409 | 300 | 0.88 mil | 9 | N/A | N/A | N/A |
| ED6750 | KATHON® LX | 300 | 0.85 mil | 8 | N/A | N/A | N/A |
| ED6750 | CANGUARD® 409 | 600 | 0.90 mil | 9 | N/A | N/A | N/A |
| ED6750 | KATHON® LX | 600 | 0.78 mil | 8 | 230 V | 0.88 mil | 7 |
| ED6750 | CANGUARD® 409 | 1000 | 0.82 mil | 9 | 220 | 0.94 mil | 9 |
| ED6750 | KATHON® LX | 1000 | 0.61 mil | 7 | 260 V | 0.96 mil | 4 |

[4]CANGUARD® 409 2-bromo-2-nitro-1,3-propane diol powder which is commercially available from Angus Chemical Co.
[5]KATHON® LX microbiocide which is a mixture of 10–12% of 5-chloro-2-methyl-4-isothiazolin-3-one, 3–5% of 2-methyl-4-isothiazolin-3-one, 14–18% magnesium nitrate, 8–10% magnesium chloride and the remainder water. "KATHON® LX microbiocide", Material Safety Data Sheet of Rohm and Haas Co. (6/24/93).

As shown in Table 1, the workability (ability to achieve the desired film thickness at a specified voltage) and appearance of the panels electrocoated with a composition including 2-bromo-2-nitro-1,3-propane diol were better than that of panels electrocoated with a composition including a mixture of 5-chloro-2-methyl-4-isothiazolin-3-one and 2-methyl-4-isothiazolin-3-one.

EXAMPLE 2
Comparison of Dosage Requirements for Bacteria Control

A five-gallon sample of ED5050B leaded cationic electrocoat (commercially available from PPG Industries) was infected with pseudonomas burkholderia cepacia bacteria such that its rating according to the test procedure described below was a "3" (i.e., very heavy infestation). This bath was then used as a stock solution to test the effectiveness of several commercially available biocides, including 2-bromo-2-nitro-1,3-propane diol.

Using an autoclave sterilized cotton swab, three light smears of the cationic electrocoat composition were coated onto an R-2A Petri Dish (commercially available from Biosan Labs, Warren, Mich. The covered Petri dish was placed in a 30° C. constant temperature oven for 72 hours to allow bacteria (if present) to grow to measurable levels. Ratings were then assigned according to the following scheme. Ratings are for visual counts without the aid of microscope.

| # of Colonies | Rating |
|---|---|
| 0 | 0 |
| 1–10 | 1 |
| 11–45 | 2 |
| 50 or more | 3 |

Each of the microbiocides listed in Table 2 were added to 400 grams of the heavily infested electrocoating composition from above and stirred for 24 hours. The electrocoating composition was then cultured for bacterial infestation according to the procedure described above. The test results are summarized in the following Table 2.

TABLE 2

| Biocide | Concentration of Biocide | Culture rating |
|---|---|---|
| None (Control) | 0 PPM | 3 |
| KATHON ® LX[6] | 15 PPM | 0 |
| KATHON ® LX | 30 PPM | 0 |
| KATHON ® LX | 45 PPM | 0 |
| CANGUARD ® 409[7] | 15 PPM | 0 |
| CANGUARD ® 409 | 30 PPM | 0 |
| CANGUARD ® 409 | 45 PPM | 0 |
| TrisNitro[8] | 100 PPM | 3 |
| TrisNitro | 200 PPM | 2 |
| TrisNitro | 300 PPM | 0 |
| DOWICIL QK-20[9] | 15 PPM | 3 |
| DOWICIL QK-20 | 30 PPM | 1 |
| DOWICIL QK-20 | 45 PPM | 0 |

[6]KATHON ® LX microbiocide which is a mixture of 10–12% of 5-chloro-2-methyl-4-isothiazolin-3-one, 3–5% of 2-methyl-4-isothiazolin-3-one, 14–18% magnesium nitrate, 8–10% magnesium chloride and the remainder water. "KATHON ® LX microbiocide", Material Safety Data Sheet of Rohm and Haas Co. (6/24/93).
[7]CANGUARD ® 409 2-bromo-2-nitro-1,3-propane diol powder which is commercially available from Angus Chemical Co.
[8]TrisNitro (50% of 2-nitro-2-hydroxymethyl-1,3-propane diol in water) is commercially available from Angus Chemical Company.
[9]DOWICIL QK-20 2,2-dibromo-3-nitrilopropionamide commercially available from Dow Chemical Corp., Midland, Michigan.

As shown in Table 2, the electrocoating compositions of the present invention which contained 2-nitro-2-bromo-1,3-propane diol as the microorganism control composition are equally effective at bacterial control as the mixture of 5-chloro-2-methyl-4-isothiazolin-3-one and 2-methyl-4-isothiazolin-3-one.

EXAMPLE 3
Length of Protection Study

Five cationic electrocoat baths were prepared as described in Table 3 below. ED5050B and ED6750 are leaded and unleaded cationic electrocoat compositions, respectively, both of which are commercially available from PPG Industries, Inc. On Day "Zero", each biocide was added to the electrocoating composition in an amount of approximately 100 ppm based on total electrocoat composition weight and the bacteria growth test was performed as described above in Example 2. Then, each of the five baths was inoculated with 50 ml of an electrodeposition permeate solution which itself had a bacteria growth rating of 3. Each bath was re-inoculated on the days indicated below in Table 4. For each bath, a sample for bacterial content testing was taken before a subsequent inoculation. The baths were sampled in this manner until all had become infected.

TABLE 2

| Bath Number | Bath Type | Biocide |
|---|---|---|
| 1 | ED5050B (leaded) | None (control) |
| 2 | ED5050B (leaded) | 100 ppm KAYTHON LX ®[10] |
| 3 | ED5050B (leaded) | 100 ppm CANGUARD 409 ®[11] |
| 4 | ED6750 (unleaded) | 100 ppm KAYTHON LX ® |
| 5 | ED6750 (unleaded) | 100 ppm CANGUARD 409 ® |

KATHON ® LX microbiocide which is a mixture of 10–12% of 5-chloro-2-methyl-4-isothiazolin-3-one, 3–5% of 2-methyl-4-isothiazolin-3-one, 14–18% magnesium nitrate, 8–10% magnesium chloride and the remainder water. "KATHON ® LX microbiocide", Material Safety Data Sheet of Rohm and Haas Co. (6/24/93).
"CANGUARD ® 409 2-bromo-2-nitro-1,3-propane diol powder which is commercially available from Angus Chemical Co.

TABLE 4

| Bath | Day 0 | Day 3 | Day 7 | Day 10 | Day 13 |
|---|---|---|---|---|---|
| 1 | 0 | 0 | 0 | 3 | 3 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |

| Bath | Day 16 | Day 20 | Day 23 | Day 27 | Day 30 |
|---|---|---|---|---|---|
| 1 | 3 | 3 | 3 | 3 | 3 |
| 2 | 0 | 0 | 0 | 0 | 0 |
| 3 | 0 | 0 | 0 | 1 | 3 |
| 4 | 0 | 0 | 0 | 0 | 0 |
| 5 | 0 | 0 | 0 | 0 | 0 |

A shown in Table 4 above, an electrodepositable coating composition including 2-nitro-2-bromo-1,3-propane diol as the sole microorganism control composition provided similar bacterial control to the mixture of 5-chloro-2-methyl-4-isothiazolin-3-one and 2-methyl-4-isothiazolin-3-one over at least a 20 day period.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

Therefore, we claim:

1. A process for electrodepositing a substantially smooth film upon a surface of an electroconductive substrate, the process comprising immersing the electroconductive substrate serving as a charged electrode in an electrical circuit comprising the electrode and an oppositely-charged counter electrode into an electrodepositable composition that upon passing electric current between the electrodes causes a substantially continuous film to deposit upon the electroconductive substrate, in the absence of a microorganism control agent the electrodepositable composition electrodeposits on the electroconductive substrate as a substantially smooth film and which upon the addition of a microorganism control agent mixture of 5-chloro-2-methyl-4-isothiazolin-3-one and 2-methyl-4-isothiazolin-3-one electrodeposits on the electroconductive substrate as a comparatively rougher film, and wherein at least a portion of the microorganism control agent mixture of 5-chloro-2-methyl-4-isothiazolin-3-one and 2-methyl-4-isothiazolin-3-one is replaced by an aliphatic hydrocarbon material selected from the group consisting of halonitroalkanes, halonitroalkenes and mixtures thereof resulting in an electrodepositable composition that electrodeposits on the electroconductive substrate as a substantially smooth film.

2. A process for electrodepositing a substantially smooth film upon a surface of an electroconductive substrate, the process comprising immersing the electroconductive substrate serving as a charged electrode in an electrical circuit comprising the electrode and an oppositely-charged counter electrode into an electrodepositable composition that upon passing electric current between the electrodes causes a substantially continuous film to deposit upon the electroconductive substrate, wherein in the absence of a microorganism control agent the electrodepositable composition electrodeposits on the electroconductive substrate as a substantially smooth film and which upon the addition of a microorganism control agent mixture of 5-chloro-2-methyl-4isothiazolin-3-one and 2-methyl-4isothiazolin-3-one electrodeposits on the electroconductive substrate as a comparatively rougher film, and wherein at least a portion of the microorganism control agent mixture of 5-chloro-2-methyl-4-isothiazolin-3-one and 2-methyl-4-isothiazolin-3-one is replaced by a hydroxyalkyl substituted nitroalkane resulting in an electrodepositable composition that electrodeposits on the electroconductive substrate as a substantially smooth film.

* * * * *